Feb. 6, 1934.   L. B. JONES   1,945,782
OSCILLATING GRATE
Filed May 9, 1930

INVENTOR
LEON B. JONES
ATTORNEY

Patented Feb. 6, 1934

1,945,782

UNITED STATES PATENT OFFICE 1,945,782

OSCILLATING GRATE

Leon B. Jones, San Francisco, Calif.

Application May 9, 1930. Serial No. 450,990

1 Claim. (Cl. 126—182)

This invention relates to grates for furnaces, and has particular reference to a grate which has peculiar usefulness in an apparatus such as is disclosed in my co-pending application, Serial No. 43,667, filed July 15, 1925.

The grate contemplated by this invention is designed primarily for use in an oil gas making apparatus, but is not necessarily restricted to such use. In the manufacture of oil gas from liquid hydrocarbon, the production of lampblack from the dissociation of the oil has presented an extremely difficult problem to handle. In the above named application, I have disclosed an apparatus for the manufacture of oil gas. In this apparatus, provision is made for collecting the lampblack produced upon a fuel bed in a closed cycle of operation.

The process practiced in this apparatus consists of cracking liquid hydrocarbon in generators which have been heated to the temperature of thermodissociation of liquid hydrocarbon. The apparatus is composed of a pair of oil gas generators and a pair of fuel receptacles, all interconnected in a manner to provide a gas circulating passage therethrough. The fuel receptacles are each provided with fuel beds which alternately furnish the heat to heat the oil gas generators and subsequently function as filter beds to collect the lampblack produced by the thermodissociation of oil for subsequent use as a fuel to promote the process. The step of filtering the gas with the entrained lampblack through the fuel beds, and of utilizing said lampblack as a fuel to promote the process, introduces a problem with which this invention purports to deal.

In practice, the lampblack is collected as a layer or coating of finely divided particles of carbon on the fuel bed, and since the process is continued in one direction for sometime, a considerable layer is collected. This layer has a tendency to pack and hamper the further filtration of gas during the collection of the lampblack, and upon coking is apt to form a hard caked layer which becomes more or less impervious to the passage of gas therethrough during the subsequent steps of forming producer gas and water gas. It is, therefore, necessary to keep the fuel bed at all times in a condition in which there are sufficient interstitial spaces to permit a circulation of gas through the bed. Consequently, the prime object of this invention is to provide a grate characterized by having means for preventing the fuel supported thereon from forming a coagulated or a fused mass.

Another difficulty encountered in fuel beds of this character is the tendency of the heat to concentrate in a central zone of the fuel. This results in leaving a cake of lampblack around the outer circumferential zone of the fuel receptacle. It would seem a simple matter to spread heat uniformly throughout the cross-sectional area of a fuel bed of the character described, but such is not the case. In order to prevent the formation of the concentrated heating zone, I have provided means for introducing air and/or steam at points beneath the grate in the outer circumferential zone of the grate area. With this arrangement, I am enabled to spread the heat uniformly throughout the bed, thus producing a more uniform producer gas, and also properly reconditioning the fuel bed for the introduction of steam to form water gas. Accordingly, it becomes another object of this invention to provide means for introducing air and/or steam in the outer circumferential zone of a grate area.

In respect to preventing the concentration of heat in a central zone, I have also devised another means which may be employed singly or in conjunction with the aforementioned means. This latter means is a part of an inner conical section which is adapted to rotate within the outer circumferential zone of the grate and assist in supporting the fuel bed.

By making the apex of the cone eccentric with respect to the axis of rotation, I am enabled to impart to the central portion of the fuel bed as much or as little agitation as desired, depending upon the amount of eccentricity given to the cone. It is, therefore, another object of this invention to provide a grate having an inner revoluble conical section, the apex of said conical section being eccentric with respect to the axis of rotation.

A specific object of this invention is to provide a grate of the character described having means for introducing steam directly beneath the grate in a manner to prevent clogging of the openings in the grate. For this purpose, I have arranged steam tuyères for admitting steam directly into the openings in the grate. In this manner, no clinkers or fused ash are formed in the grate openings, due to the cooling action of the steam.

It is another object of this invention to provide a grate that imparts a wave-like undulating movement to the fuel supported thereon.

Briefly stated: my invention consists in a grate having a central portion in the shape of a revoluble cone, said cone having a flattened surface, or surfaces, thereon to transmit an undulating motion to refractory spheres that ride upon said cone, together with an inwardly sloping outer stationary grate section provided with means for admitting air and/or steam to the fuel supported on said spheres.

The foregoing objects and advantages, together with the subsequent features developed in the description, will be best appreciated from the drawing in which—

Figure 1:
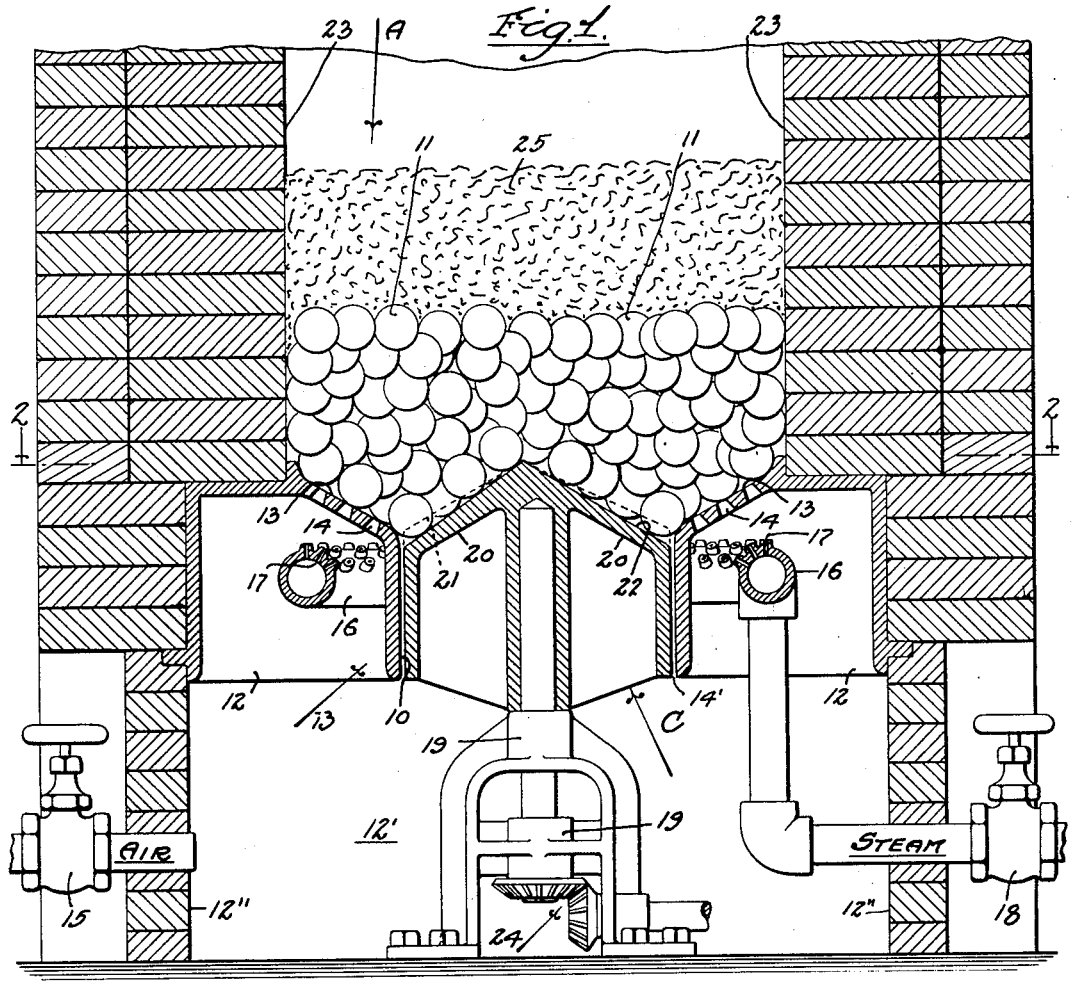
Fig. 1 is a vertical section showing an embodiment of my invention.
Figure 2:
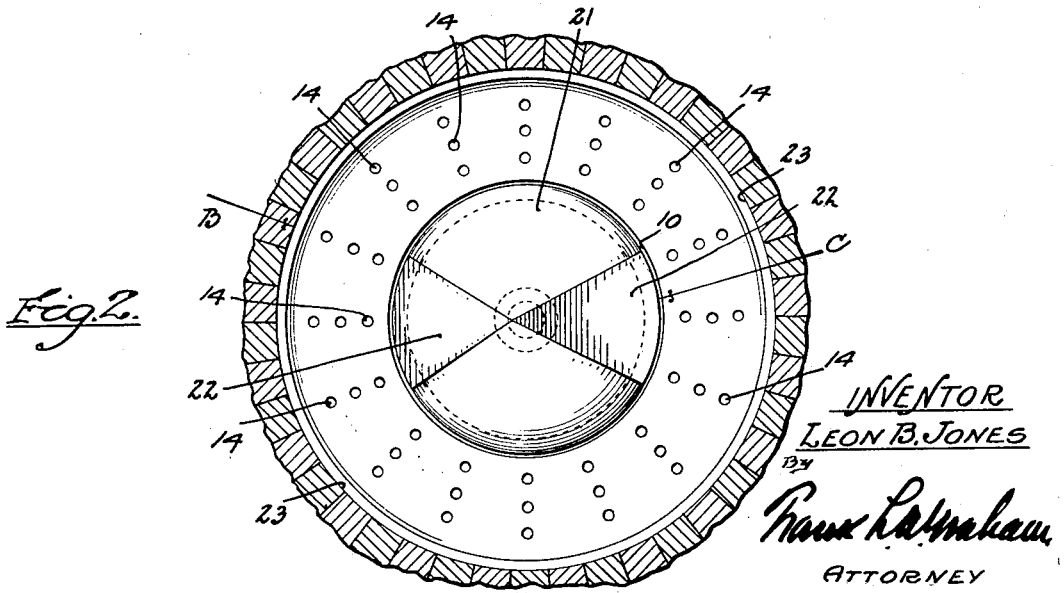
Fig. 2 is a section taken on line 2—2 of Fig. 1.

In the drawing, I have represented my invention somewhat diagrammatically. Since the principle involved in this invention is applicable in any type of furnace wherein agitation of the fuel bed is required, I have chosen this method of illustration for the purpose of exemplifying merely the function and the construction of my invention. The component parts of the structure comprising my invention consists of a fuel receptacle generally designated A, into the lower end of which is fitted an annular member generally designated B. The annular member B is provided with a central opening 10, which rotatably receives a conically shaped unit C. Supported by the members B and C are a plurality of spherical ball members of refractory material, designated 11. The foregoing constitute the principal elements of my invention.

More specifically describing the member B, it will be observed to comprise an annular grate 12 having an upper sloping face 13. The face 13 is formed with spaced openings 14 for the purpose of admitting air and/or steam into the fuel receptacle. The under part of the member B is left open to the ash pit 12' for the purpose of receiving air conducted to the pit.

Means is provided for introducing air into the ash pit 12', and, as shown, consists of a valued inlet 15 mounted in the wall 12'' of the ash pit. With this arrangement, air may be introduced into the pit 12' and pass through the openings 14 and the annular space 14' between the members B and C into the zone of fuel. Means is also provided for passing steam through the openings 14, and preferably consists of a circular unit 16 mounted in the member B, said unit having a plurality of tuyères on the upper side thereof arranged to inject steam directly into the openings 14. Steam is conducted to the unit through a valved inlet 18. In order to prevent clogging of the openings 14 by the formation of clinkers or fused ash, I have found it advisable to so locate the tuyères 17 that an individual tuyère will be directly beneath a respective opening.

The unit C is rotatably mounted in the opening 10 provided in the member B. The means of mounting said unit may comprise bearings 19, or any other suitable means may be substituted therefor. As before stated, the upper surface of the unit C is conical in shape, as shown at 20. In order to transmit an undulating motion, as well as a rotating motion, to the balls 11, the upper surface 21 of the cone C is flattened, as shown at 22. It is thus clear that a rotation of the cone will not only rotate the spheres resting thereupon, and cause an agitation to the fuel supported on the spheres, but will also impart an undulating movement to a section of the balls as the flattened surface passes therebeneath. The peculiar arrangement of the cone with the flattened surfaces will be appreciated not only as imparting an upward movement to the spheres, but also as exerting an outward force on the balls perpendicular to the flattened face of the cone. This movement will cause the balls 11, which are resting near the walls 23 of the fuel chamber, to also receive a movement. The result is a continuous agitation of the balls in all sections of the fuel chamber, which, in turn, reacts to break up any caking or coagulation of the fuel which is deposited upon the balls. This is one of the benefits sought in this invention. For the purpose of agitating the central zone of fuel to prevent undue heat concentrating at this point, I have formed the apex 26 of the cone C off center. This results in an eccentricity to the upper surface of the cone which, upon rotation, reacts to impart a disturbance to the balls 11 supported thereon in the vicinity of the apex, and, consequently, prevents the concentration of heat in a central zone. Any suitable means for driving the cone may be employed, such as shown at 24.

In operation, the cone C may be revolved continuously or intermittently, as the occasion requires, and the resultant movement set up amongst the balls 11 will react to agitate the fuel bed 25 supported thereon in a manner to prevent the bed from packing or caking, and will thus provide a fuel bed which is continuously operable to pass gas therethrough for the purpose of collecting entrained lampblack upon the bed, which alternately serves as fuel and a filter bed.

Although I have shown the principal components of my invention somewhat diagrammatically and in connection with an oil gas making apparatus and have directed the description to that particular embodiment shown, nevertheless, I am aware that certain features of my invention may, of themselves, be utilized in combination with other means and that the entire invention may find general usefulness in other fields. It is, therefore, my intention to include all such uses and adaptations of my invention and any components parts thereof, together with such refinements and modifications that come within the scope of the disclosure and the essence of the invention as expressed in the appended claim.

I claim as my invention:

A grate for furnaces comprising: a fixed perforated ring which slopes downwardly toward the center; an imperforate conical member rotatably mounted in said ring with its apex offset relative to the axis of rotation, said conical member having a flattened top face formed thereon; a body of refractory members loosely supported by said ring and said conical section; and means including tuyères positioned directly below the perforations in said ring for injecting steam through said perforations.

LEON B. JONES.